Figure 1:
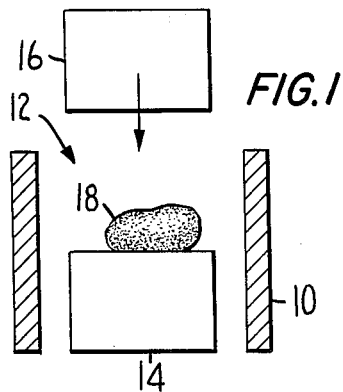

Feb. 15, 1966    P. H. HOFER    3,235,643
METHOD AND APPARATUS FOR MOLDING OF ARTICLES
WITH FINISHED EDGES
Filed Nov. 5, 1962

INVENTOR.
PETER H. HOFER
BY Walter C. Kehm
ATTORNEY

United States Patent Office 3,235,643
Patented Feb. 15, 1966

3,235,643
METHOD AND APPARATUS FOR MOLDING OF ARTICLES WITH FINISHED EDGES
Peter H. Hofer, Berkeley Heights, N.J., assignor to Union Carbide Corporation, a corporation of New York
Filed Nov. 5, 1962, Ser. No. 235,201
20 Claims. (Cl. 264—268)

This invention relates to the molding of flash-free plastic articles with finished edges.

One of the problems encountered in the conventional molding of plastic articles is how to prevent the escape of the molten material being molded from between the forming members into flash-forming regions. For example, in compression molding devices having two die members within a die cavity, the clearances between the die members and the inner walls of the cavity must be extremely small in order to prevent the molten material from escaping into those regions and forming flash. Flash not only represents a loss of material from the molded article, but also forms rough edges which require additional trimming or smoothing operations or even rejection of the entire article. When the molten material being molded has a relatively high melt index, the requirement for close tolerances is even more severe than in the case of low melt index materials. For example, in the compression molding of low density polyethylene, tolerances of less than 0.0007 inch are often required. Although such tolerances can be achieved by careful machining in circular mold shapes, such precision is difficult or even impossible to obtain in irregularly shaped molds.

It is therefore, the main object of the present invention to provide an improved molding process and apparatus which prevents escape of the molten material from between the forming members into flash-forming regions.

It is another object of the invention to provide such a process and apparatus which obviate extremely close tolerances between the mold elements.

A further object of the invention is to provide such a process and apparatus which permit economical production of flash-free articles from irregularly shaped molds.

A still further object is to provide an improved process and apparatus for molding plastic liners in container closures.

Other aims and advantages of the invention will be apparent from the following description and appended claims.

Figure 2:
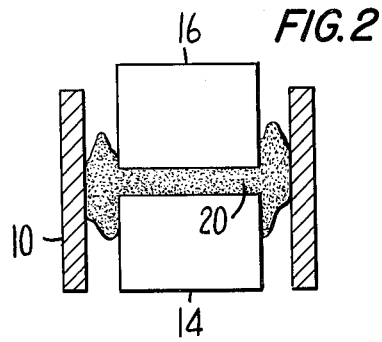
Figure 3:
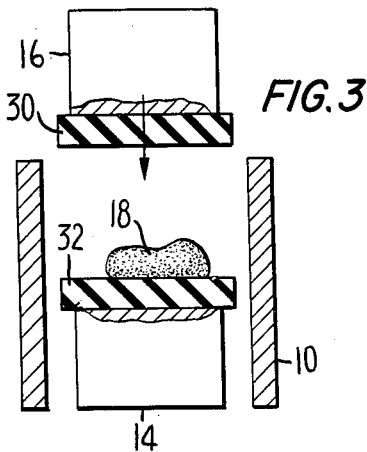
Figure 4:
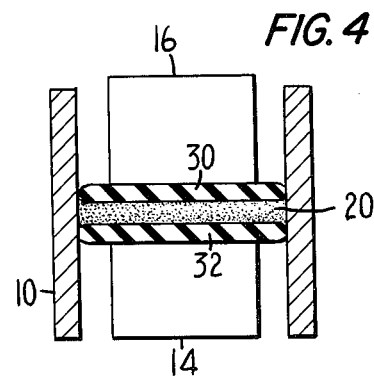
Figure 5:
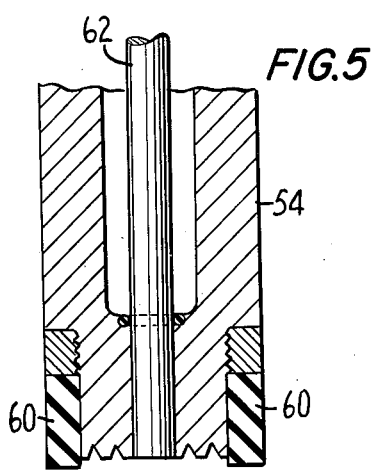
Figure 6:
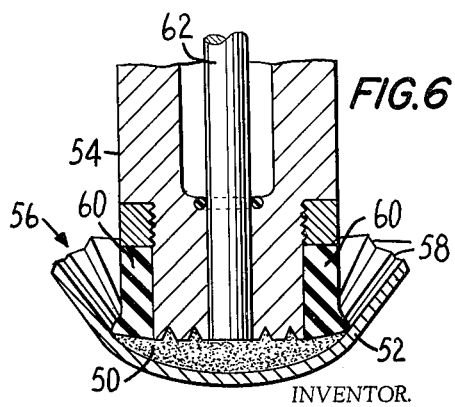

In the drawings:

FIGS. 1 and 2 are schematic elevation views illustrating the operation of a conventional compression molding process and apparatus without the use of the present invention;

FIGS. 3 and 4 are schematic elevation views illustrating the operation of the process and apparatus of FIGS. 1 and 2 utilizing the present invention; and FIGS. 5 and 6 are schematic elevation views illustrating one specific embodiment of the invention.

In accordance with the present invention, there is provided a process and apparatus for molding flash-free articles by compressing a molten plastic material between at least two forming members while providing at least one deformable and substantially resilient and non-compressible sealing member between the forming members to prevent the escape of the molten plastic material from between the forming members into flash-forming regions. The sealing member is preferably a rubber annulus disposed between the mating edges of the mold in closed position and around the molten plastic material to be molded.

By providing a deformable, resilient, and non-compressible sealing member between the forming members to prevent the escape of molten material therefrom, this invention makes possible the production of flash-free articles from molds having relatively large clearances between the forming members. This makes the manufacture of the molds considerably less expensive. In fact, this process is so effective that flash-free articles have been produced from compression molds having as much as $\frac{1}{16}$ inch clearance between the dies and the cavity wall. Also, irregularly shaped molds, which would not be feasible if extremely fine tolerances were necessary, can be used to produce articles with flash-free finished edges. Moreover, due to the larger clearances permitted by this invention, alignment of the upper die in a compression mold with the die cavity is not critical. As a result, the special guide pins which are usually employed in such molds can be eliminated, resulting in less expensive construction and the production of larger articles for a given mold size. The absence of guide pins also provides the mold with a completely open throat, which facilitates the feeding and removal operations.

Since the sealing member employed in this invention is resilient and non-compressible, the pressure exerted on it by the forming members and the molten plastic material during the molding operation deforms rather than compresses the sealing member. As a result, the sealing member gradually fills any gaps between the forming members and thereby prevents the escape of the molten plastic material from between the forming members into flash-forming regions. Moreover, since the resilient sealing member seals the gaps gradually as it is subjected to compressive forces during the molding operation, it does not prevent the egress of air from the mold cavity.

The forming member may be made of any suitable material which is deformable and substantially resilient and non-compressible. Examples of such materials are natural rubbers, either vulcanized or unvulcanized, and synthetic rubbers, such as polybutadiene, butadiene-styrene copolymers, butadiene-acrylonitrile copolymers, polyisoprene, ethylene-propylene copolymers, and ethylene-ethylacrylate copolymers.

The invention will be described in greater detail by referring to the drawings.

FIGS. 1 and 2 schematically illustrate the operation of a conventional compression mold without the use of the present invention. The conventional compression mold generally comprises a cylindrical mold shell 10 defining a die cavity 12, a lower die or forming member 14 positioned within the die cavity 12, an upper die or forming member 16 movably mounted so that it can be forced downwardly through the die cavity 12 toward the lower die 14 and means (not shown) for so moving the upper die 16. In operation, a plastic mass 18 of predetermined quantity is deposited on the face of the lower die 14, and the upper die 16 is forced downwardly onto the plastic mass 18 at a predetermined pressure so as to compress the plastic mass 18 into an article 20 of the desired shape. Of course, the shape of the article 20 is determined by the configuration of the mating surfaces of the dies 14 and 16. The plastic mass 18 should be molten while being compressed. This may be accomplished either by premelting the plastic material, before or after depositing it on the lower die 14, or by melting it with heat conducted through one of the dies. Since the art of compression molding is well known, further details thereof will not be described herein. Still referring to FIGS. 1 and 2, the clearances between the dies 14 and 16 and the walls of the mold cavity 12 have been exaggerated in order to show how flash 22 is formed in the gaps between the dies and cavity wall as the molten plastic material is compressed.

FIGS. 3 and 4 schematically illustrate the operation of the mold of FIGS. 1 and 2 utilizing the present invention. The mold contains the same elements described above in connection with FIGS. 1 and 2 with the addition of rubber discs 30 and 32 mounted on the mating faces of the dies 14 and 16. The rubber discs 30 and 32 are deformable and non-compressible, so that they behave like a hydraulic fluid and are also resilient. In other words, when pressure is applied to the faces of the rubber discs, they increase in diameter as they decrease in thickness, rather than just decreasing in thickness. Thus, as the dies 14 and 16 are forced together, the pressure exerted on the rubber discs 30 and 32 by the dies and the compressed plastic mass gradually deform the discs so that they protrude radially outward and seal the gaps between the dies 14 and 16 and the inner wall of the shell 10, thereby preventing the escape of the molten plastic material from between the forming members into the flash-forming regions.

The dimensions of the rubber sealing member are chosen in accordance with the particular type of rubber employed, the magnitude of the pressures to be exerted on the sealing member during molding, and the widths of the gaps to be sealed to insure not only that all gaps are sealed but also that the desired surface configuration is produced in the molded article. For example, if a rubber ring instead of a disc is used as the sealing member and it is desired to produce an article with a perfectly flat surface, the dimensions of the rubber ring should be such that the pressure exerted thereon distorts it just enough to make it flush with the die face and to fill the desired gaps. Similarly, a peripheral groove can be produced in the molded article by using a thicker rubber ring so that the distorted ring still protrudes beyond the face of the die. It is also possible to completely cover one or both of the die faces with shaped rubber pieces, although this leads to poor heat transfer between the metal dies and the plastic mass. In effect, the sealing member often represents part of the shaping face of the die or other forming member, and numerous modifications can be made in the size and shape of the sealing member to produce various effects in the molded article.

When the sealing member is rubber, it can be vulcanized onto a machined steel part which can be readily threaded or otherwise attached to the metal die. When the rubber becomes damaged or worn, it can then be easily replaced by disengaging the metal part and replacing it with a new one.

One specific application of the present invention is the molding of plastic liners in a container closure as illustrated in FIGS. 5 and 6. The plastic liner 50 is formed by placing a small mass of plastic material on the inner surface of the top of an inverted closure 52 and then molding it into a liner by pressing a die 54 downwardly into the closure. In other words, both the die 54 and the closure 52 act as forming members. However, in the case of crown caps (FIG. 6) the skirt 56 of the closure has flutes 58 which permit some of the molten plastic material to escape upwardly and form flash along the inside of the skirt 56. In addition, the escaping material may result in liners which are not completely filled out. In order to overcome these problems by the present invention, a rubber sealing annulus 60 is placed around the plastic mass between the two forming members, i.e., between the die 54 and the closure 52. The rubber sealing annulus 60 may be mounted in a peripheral groove on the die 54, as shown in the drawings, or may be in the form of a separate ring placed on the periphery of the inner surface of the top of the cap. As the die 54 is formed downwardly against the plastic mass in the cap 52, the pressure exerted on the rubber ring 60 by the forming members and the compressed plastic mass deforms the ring 60 so that it protrudes into the flutes 58 and seals the gaps between the die 54 and the closure 52, thereby preventing the escape of molten plastic material through the flutes without preventing the egress of air from the mold cavity.

In addition to its sealing action, the rubber annulus 60 wedges the crown cap 52 onto the die 54. This wedging action can be used to lift the crown cap off its supporting pad when the die is retracted, thus eliminating the need for a lift-up or pull-up device. In cases where the supporting pad is heated, this simultaneous removal of cap and die begins the cooling of the cap much faster and at the same time empties the heated supporting pad for receiving and preheating the next cap. The cap that is wedged onto the die can be removed by conventional means, such as a knockout pin 62 or an external stripper ring (not shown).

In a first example of the invention, a device such as that illustrated in FIGS. 1 and 2 and having a cavity diameter of 1.0625 inches and a clearance of 0.0015 inch between the upper die and the cavity wall was used to mold a thin plastic disc from a molten mass of low density polyethylene. Between the upper die and the cavity wall flash was formed with a height of about ⅛ inch, which was about twice the height of the molded disc. A solid rubber disc ⅛ inch thick and 1,000 inch in diameter was then cut out and placed on the upper surface of the lower die surrounding the plastic mass to be molded. The rubber had a durometer of about 45. Again a disc was formed by compressing the plastic mass between the two dies at the same pressure employed previously. As the pressure was applied, the rubber disc flattened out and effectively sealed the gaps between the die edges and the cavity walls. The resulting molded disc had no flash on the side formed against the rubber disc.

The example described above was repeated using two rubber discs ⅛ inch thick and 1.000 inch in diameter. One disc was placed on the lower die surface and the other on the upper die surface so that the plastic mass was sandwiched therebetween. Compressing the two dies and accompanying rubber discs together resulted in flash-free plastic discs ranging in diameter from 1.041 to 1.051 inches which was 0.041 to 0.051 inch larger than the diameter of the unpressed rubber discs.

In another example of the invention, a device such as that illustrated in FIGS. 5 and 6, but without the rubber sealing ring, was used to mold a plastic liner in each of a plurality of crown caps having tapered fluted skirts. The inner surface of the top of each cap was first coated with an adhesive (thickness between 0.5 and 4.0 mg. per square inch). Next, a drop (0.210 to 0.400 gram) of molten low-density polyethylene was deposited on the adhesive-coated surface and the cap heated to about 150 to 175° to soften the adhesive coating. The steel die was then pressed downwardly into the cap at a pressure of about 5000 pounds so as to mold the molten polyethylene into a cap liner which adhered to the adhesive-coated inner surface of the top of the cap. The crown cap was supported on a rubber cushion (about 45 durometer) to prevent damage to the printed and lacquered outside surface. After the die had reached its lowermost position, it was held in that position for about 1.0 to 1.5 seconds in order to cool the molded liner. The die was then withdrawn and the cap removed from the rubber cushion.

In a first series of runs of the aforedescribed process, no sealing element was provided between the die and the crown cap. In the case of the thin liners (0.2 gram molten polyethylene), some of the molten polyethylene escaped from under the die and was forced up the flutes in the cap skirt, and many of the liners were not completely filled out. In the case of the heavier liners (0.4 gram molten polyethylene), the liners were always filled out, but an excessive amount of molten plastic still crept up the flutes and formed unsightly little balls at the end of the skirt. Also, the plastic material in the flutes of the cap skirt would prevent proper crimping of the crown cap down onto the bottle to be sealed.

In a second series of runs, rubber rings ranging from 1/64 to 1/16 inch in width were cut out and placed on the periphery of the inner surfaces of the inverted caps surrounding the plastic mass to be molded. The rubber had a durometer of about 45. When the die was lowered, the rubber ring was distorted outwardly into the flutes in the cap skirt, effectively sealing the molten plastic within the periphery of the crown bottom. The resulting liners had no flash and were completely filled out, regardless of the initial location of the molten mass and the amount used (0.400 to 0.200 gram). In fact, some of the droplets of molten polyethylene were intentionally placed at the very edge of the bottom of the cap, and still no flash was produced.

In a third series of runs, a groove was cut in the periphery of the die and a rubber ring mounted therein. The results were the same as when the rubber ring was placed in the cap surrounding the plastic mass.

While various specific forms of the present invention have been illustrated and described in detail herein, it will be understood that the same are susceptible of numerous modifications within the scope of the invention. For example, although the invention has been described with particular reference to compression molding, it is equally applicable to injection molding and other types of molding processes. Also, although it is usually desirable to use the forming members to exert the desired compressive force on the deformable sealing member, separate compressing means may be provided to subject the sealing member to compressive force.

What is claimed is:

1. A process for producing flash-free articles which comprises placing a mass of molten plastic material in a mold having at least two forming members having gaps therebetween, providing at least one deformable resilient and non-compressible sealing member disposed annularly about at least one of said forming members and adjacent to said gaps and then subjecting said sealing member and said molten plastic material to compressive forces so that said sealing member protrudes into said gaps and prevents the escape of said molten plastic material from between said forming members into flash-forming regions.

2. A process for molding flash-free articles comprising compressing a molten plastic material between at least two forming members while providing at least one deformable resilient and non-compressible sealing member disposed annularly about at least one of said forming members to prevent the escape of said molten plastic material from between said forming members into flash-forming regions.

3. The process of claim 2 wherein said sealing member is a rubber annulus which is disposed annularly about and adjacent to the mating edges of said forming members in closed position and around said molten plastic material between said forming members.

4. A process for molding flash-free articles comprising compressing a molten plastic material between at least two forming members while providing at least one deformable resilient and non-compressible sealing member annularly disposed adjacent to the edge of at least one of said forming members so that the pressure exerted on said sealing member by said forming members and said molten plastic material deforms said sealing member until it seals any gaps between said forming members, thereby preventing the escape of said molten plastic material from between said forming members into flash-forming regions without preventing the egress of air from the mold cavity.

5. A process for molding flash-free articles in a compression molding assembly having two dies which are movable toward and away from each other in a die cavity, said process comprising compressing a molten plastic material between said dies within said cavity while providing a deformable resilient and non-compressible sealing member annularly disposed about said dies to prevent the escape of said molten plastic material from between said dies into the flash-forming regions between the outer surfaces of said dies and the inner walls of said cavity.

6. The process of claim 5 wherein said sealing member is a rubber annulus.

7. A process for molding flash-free plastic liners in a container closure comprising compressing a small mass of molten plastic material between the inner surface of the top of said closure and a die member while providing a deformable resilient and non-compressible sealing member between said die member and the inner surface of said closure to prevent the escape of said molten plastic material from said inner surface of the top of said closure.

8. The process of claim 7 wherein said sealing member is a rubber annulus disposed around said mass of molten plastic material.

9. The process of claim 7 wherein said container closure is a crown cap with a fluted skirt and said sealing member prevents the escape of said molten plastic material into the flutes of said skirt.

10. Apparatus for producing flash-free articles from a mass of molten plastic material consisting essentially of a mold having at least two forming members which are movable toward and away from each other the improvement comprising providing, at least one of said forming members with a deformable resilient non-compressible sealing member and means for subjecting said sealing member to compressive force so that it forms a seal between adjacent forming members.

11. Apparatus for producing flash-free articles from a mass of molten plastic material consisting essentially of a mold having at least two forming members that are movable toward and away from each other the improvement comprising providing, at least one of said forming members with a deformable resilient and non-compressible sealing member, said sealing member being located such that it is subjected to compressive force as said forming members are moved toward each other and form a seal between adjacent forming members.

12. Apparatus for molding flash-free articles consisting essentially of at least two forming members; means for compressing a molten plastic material between said forming members; the improvement comprising providing at least one deformable resilient and non-compressible sealing member annularly disposed about and adjacent to the edges of said forming members to prevent the escape of said molten plastic material from between said forming members into flash-forming regions.

13. The apparatus of claim 12 wherein said sealing member is a rubber annulus.

14. Apparatus for molding flash-free articles consisting essentially of at least two forming members; means for compressing a molten plastic material between said forming members; the improvement comprising providing at least one deformable resilient and non-compressible sealing member annularly disposed about and adjacent to the edges of said forming members so that the pressure exerted on said sealing member by said forming members and said molten plastic material deforms said sealing member until it seals any gaps between said forming members thereby preventing the escape of said molten plastic material from between said forming members into flash-forming regions.

15. Apparatus for molding flash-free articles consisting essentially of a compression mold having two dies which are movable toward and away from each other in a die cavity; means for compressing a molten plastic material between said dies within said die cavity; the improvement comprising providing a deformable resilient and non-compressible sealing member annularly disposed about and adjacent to the edges of said dies to prevent the escape of said molten plastic material from between said dies into the flash-forming regions between the outer surfaces of said dies and the walls of said cavity.

16. The apparatus of claim 15 wherein said sealing member is a rubber annulus.

17. Apparatus for molding flash-free plastic liners in a container closure consisting essentially of support means for said closure; a die member for molding a plastic liner on the inner surface of the top of said closure; means for compressing a molten plastic material between said die and said inner surface of the top of said closure; the improvement comprising providing a deformable resilient and non-compressible sealing member between said die member and the inner surface of said closure to prevent the escape of said molten plastic material from between said die member and said inner surface of the top of said closure.

18. The apparatus of claim 17 wherein said container closure is a crown cap with a fluted skirt and said sealing member is a rubber annulus disposed around said molten plastic material to prevent the escape of said material into the flutes of said skirt.

19. A forming member for use in molding flash-free articles, said forming member having at least one deformable resilient and non-compressible sealing element mounted thereon.

20. A forming member for use in molding flash-free articles, said forming member having a deformable resilient and non-compressible sealing annulus mounted on the periphery thereof.

References Cited by the Examiner

UNITED STATES PATENTS

| | | |
|---|---|---|
| 2,823,422 | 2/1958 | Schneider. |
| 2,881,480 | 4/1958 | Waters. |
| 2,963,738 | 12/1960 | Brandes et al. |
| 2,965,946 | 12/1960 | Sweet et al. |
| 3,056,166 | 10/1962 | Weinberg. |
| 3,094,758 | 6/1963 | Downie et al. |

J. SPENCER OVERHOLSER, *Primary Examiner.*

MICHAEL V. BRINDISI, WILLIAM J. STEPHENSON,
*Examiners.*